Patented Apr. 9, 1940

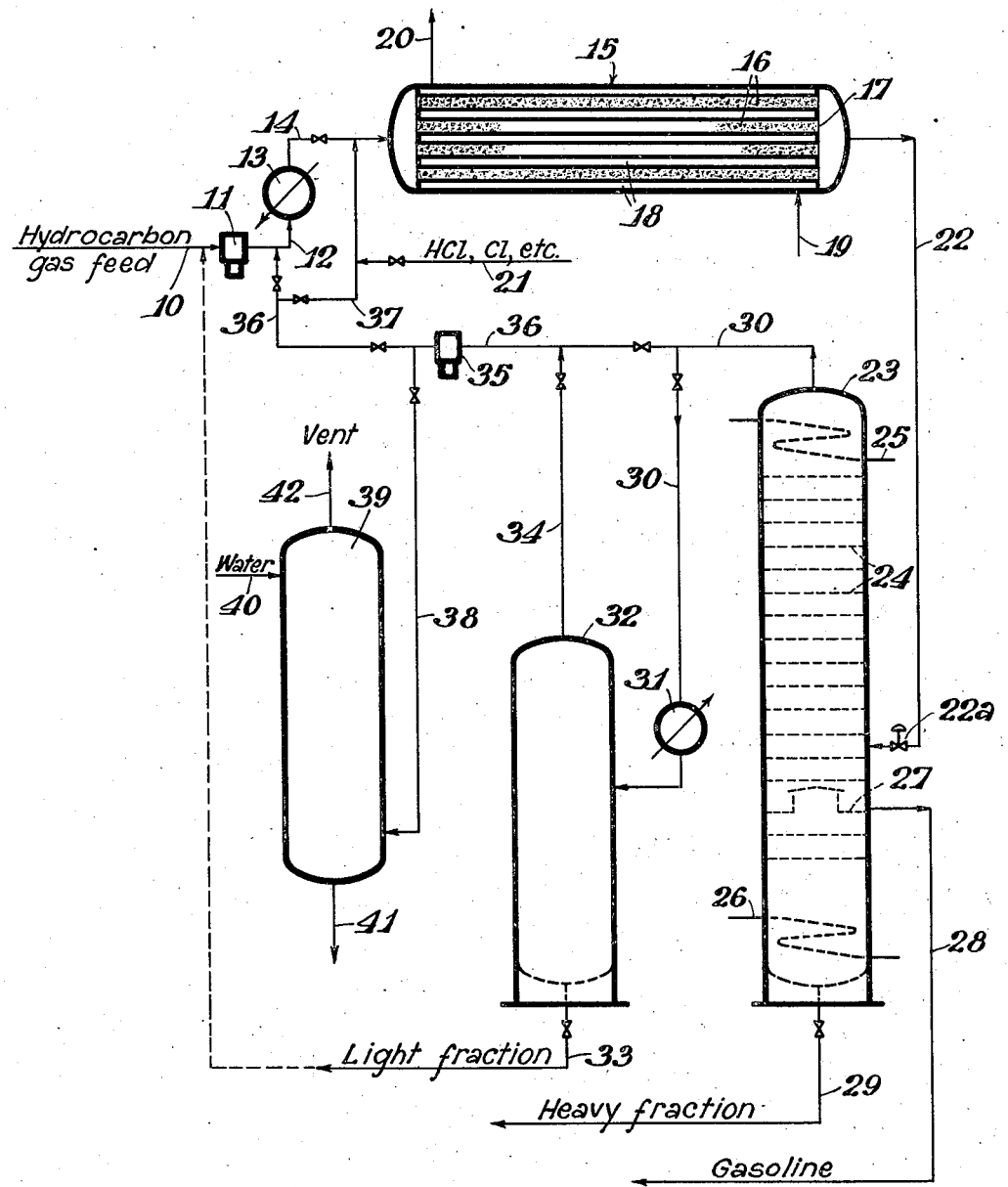

2,196,831

UNITED STATES PATENT OFFICE 2,196,831

GASOLINE PRODUCTION

Carl Max Hull and Ford H. Blunck, Chicago, Ill., assignors to Standard Oil Company, Chicago, Ill., a corporation of Indiana Application December 30, 1937, Serial No. 182,556

11 Claims. (Cl. 196—10)

This invention relates to gasoline production and it pertains more particularly to the preparation of high quality motor fuel from saturated hydrocarbon gases by conversion processes, particularly by alkylation.

Aluminum chloride has long been known to be an important catalyst for the conversion of hydrocarbons into different form and for the synthesis of hydrocarbon products by combination of lower molecular weight hydrocarbons. The synthesis which comprises essentially the combination of a paraffin with an olefin gas is called alkylation. We have found that saturated hydrocarbons, particularly isobutane, will react with olefins, particularly gaseous olefins such as ethylene, propylene or the butylenes, to yield normally liquid hydrocarbons in the gasoline boiling range, which liquids are characterized by very high knock ratings (octane number). An object of our invention is to provide an improved catalyst for such alkylation reactions and to provide an improved process for effecting the alkylation.

Aluminum chloride which has heretofore been suggested as an alkylation catalyst is subject to the serious drawback that its catalytic activity is relatively short-lived. An object of our invention is to provide a catalyst and method of operation which will result in longer runs and better gasoline yields than have heretofore been obtained. Other objects will be apparent from the following detailed description.

We have discovered in our work on the alkylation of isobutane with isobutylene at low temperatures that old samples of aluminum chloride, samples containing appreciable quantities of alumina as an impurity, while producing a lower total yield of products, tended to give a higher percentage of the total product in the gasoline range than fresh samples of AlCl₃. In other words, we have discovered that the catalyst for alkylation is not aluminum chloride, but a mixture of alumina with aluminum chloride, the latter being present in amounts of about 10% to 50%, preferably about 35%. This alumina-aluminum chloride catalyst mixture is supplemented by the action of HCl which may be introduced as such or which may be liberated from the aluminum chloride by traces of moisture.

Our invention is based upon the above discoveries and in practicing it we employ alumina mixed with 10–50% of aluminum chloride activated with HCl or other halide acid, organic halide or halogen promoter to effect the alkylation or chemical combination of normally gaseous hydrocarbons, particularly the combination of saturated hydrocarbons with unsaturated hydrocarbons. A feature of our invention is our use of relatively low temperatures, liquid phase reaction conditions, and pressures slightly in excess of the requirement to keep the reacting products in the liquid phase. While we prefer to operate our process in the liquid phase with corresponding low temperature range (—50 to +250° F.) and at relatively low pressures (15 to 600#/sq. in.), nevertheless our process is operable in the vapor phase at temperature ranges within the range of 100° to 500° F. and at pressures of 100# to 5000#/sq. in.

The invention will be more clearly understood from the following detailed description and by reference to the accompanying drawing which forms a part of this disclosure and in which the single figure is a flow diagram of that part of the alkylation system in which our invention is practiced.

The charging stock for our process may be a mixture of saturated and unsaturated gases from any source whatsoever. We prefer to employ that fraction which includes the $C_2$, $C_3$ and $C_4$ hydrocarbons in petroleum refinery gases. Such gases may be obtained from a wide number of sources such as cracking stills, stabilizers, absorbers, distillation units, etc. and the analysis of the gases may vary within wide ranges. Preferably the gases should contain about 25% to 50% olefins such as ethylene, propylene and the butylenes, and it should contain among its saturated components as high a percentage as possible of iso-butane. Our process is effective with little or no isobutane but we prefer to have 2% to 20% of isobutane in the feed stock. The saturated paraffins are not inert in our process as they would be in simple polymerization, they actually enter into the reaction and become chemically combined with the olefins.

The feed stock gases are introduced from any suitable storage, through gas line 10 to compressor 11, which discharges them at about 15 to 5000#/sq. in. (depending upon the operating temperature and the feed stock), into line 12, heat exchanger 13, line 14 and catalyst chamber 15. We have found that this alkylation may be effected at temperatures of —50 to +500° F., and in operating a heat transfer medium is passed through heat exchanger 13 to regulate the temperature of the feed stock. We prefer to operate at as low a temperature as possible because of the more favorable thermodynamic equilibria at low temperatures. However, in the case of relatively inactive reactants it is necessary to employ higher temperatures in order to obtain appreciable yields in a reasonable length of time. Thus, with the very reactive olefin-paraffin mixture, isobutylene-isobutane, we may effect alkylation at temperatures as low as −40° F. and at essentially atmospheric pressure. On the other hand, with a feed such as ethylene-isobutane mixture it may be necessary to operate at about 500° F. and at a pressure of 2000#/sq. in. or higher, for example up to about 5000#/sq. in. in order to accomplish alkylation in a reasonable length of time.

The catalyst chamber 15 is preferably in the form of a heat exchanger consisting of a bundle of catalyst tubes 16 welded in header plates 17 and surrounded by spaces 18 for heat transfer medium introduced through line 19 and discharged through line 20. The catalyst in tubes 16 is preferably a mixture of alumina and aluminum chloride, which may be formed by admixing alumina with AlCl₃; the alumina may be in the form of crude bauxite ore or bauxite residues. The physical form of the catalyst should be such that it can come into intimate contact with hydrocarbon undergoing treatment, and it is immaterial if the catalyst contains other matters such as silica, clay, etc. The tubes are preferably loosely packed with this catalyst, preferably in the form of small pellets, with suitable screens or filters at each end of the tubes to prevent displacement of finely divided catalyst material.

Before the feed is introduced into the catalyst chamber we admix with it about 0.001% to 1.0% of a halogen or halogen compound, preferably HCl, although chlorine or organic halides may be employed if desired. Carbon tetrachloride is an excellent organic halide promoter, but we prefer to use halides having low molecular weight alkyl radicals containing from about 4 to 8 carbon atoms so that on giving up the halogen content they become a part of the finished motor fuel. The halogen catalyst promoter is introduced through line 21 to line 14 at or near the point where this line discharges into the catalyst chamber.

The feed stock with a small amount of added halide catalyst promoter is passed slowly through the catalyst tubes which are maintained at the desired reaction temperature by a heat transfer medium introduced through line 19 and discharged through line 20. The reaction products leaving the system through line 22 pass through pressure release valve 22a and are then introduced into fractionator 23 which is supplied with conventional fractionating or bubble plates 24, a reflux coil 25, a reboiling coil 26 and trap-out plate 27. This tower is operated under conditions of temperature and pressure to enable the withdrawal of gasoline from trap-out plate 27 through line 28, the withdrawal of heavy fractions from the base of the tower through line 29 and the withdrawal of uncondensed gases through line 30. These gases may be further cooled in exchanger 31 and separated in tower 32 into light oil fractions which are withdrawn from the base of the tower through line 33, and gases which may be withdrawn from the top of the tower through line 34 and returned by pump 35 through line 36 to line 12, or through line 37 to line 14.

It should be understood that in our alkylation process the light fractions from line 33 may be recycled with incoming feed stock, particularly if the feed stock is rich in olefinic gases. We may, for example, pass the gaseous materials directly from line 30 to line 12, thru line 36.

In many operations there will be a certain amount of cracking taking place along with the alkylation reaction, and in such cases there may be an accumulation of methane, ethane, hydrogen, etc. in the system. Should such gases tend to build up, they may be vented through line 38 into a suitable scrubber 39 into which water or a neutralizing fluid or absorber is introduced through line 40 and withdrawn, together with the HCl through line 41, the gases being withdrawn from the system through line 42. Similarly, the liquid products of our system may be neutralized and freed from HCl if the fractionation system does not accomplish this result to the desired extent. In both cases the recovered HCl may be returned to the system if such recovery is warranted from an economic standpoint.

It should be understood that we may employ any conventional type of catalyst chamber and we do not limit ourselves to the particular type herein disclosed. Similarly, the catalyst may be mounted on suitable carriers which may be solids or liquids.

While we have described in detail a preferred embodiment of our invention, it should be understood that we do not limit ourselves thereto except as defined by the following claims, which should be construed as broadly as the prior art will permit.

We claim:

1. The method of reacting paraffinic and olefinic hydrocarbon gases containing 2 to 4 carbon atoms per molecule to form high quality motor fuel, which comprises treating a mixture of such paraffinic and olefinic hydrocarbon gases in a liquid state under pressures of from 15 to 5000 pounds per square inch with a catalyst comprising alumina mixed with 10-50% AlCl₃ supplemented by a promoter of the class consisting of halogens, organic halides and halogen acids.

2. The method of claim 1 wherein the promoter is admixed with hydrocarbons prior to their contact with the alumina-AlCl₃ catalyst.

3. The method of claim 1 wherein the reaction is effected at a temperature below 0° F. and a pressure below 600 pounds per square inch.

4. The method of converting a mixture of paraffinic and olefinic hydrocarbon gases containing from about 2 to 20% of isobutane to high quality motor fuel, which comprises liquefying said gases, introducing about .001 to 1.0% of a promoter of the class consisting of halogens, organic halides and halogen acids into the liquefied gases, and contacting said promoter-containing liquefied mixture with alumina-AlCl₃ catalyst under superatmospheric pressure to effect alkylation.

5. The method of claim 4 wherein the reaction is effected at temperatures below 0° F.

6. The method of making high quality motor fuel out of olefin-containing gases and paraffinic hydrocarbon gases which comprises introducing a small amount of a promoter of the class consisting of halogens, organic halides and halogen acids into a mixture of olefin-containing gases and paraffinic hydrocarbon gases, and contacting said mixture with catalytically active alumina-AlCl₃ mixtures under a pressure of from 15 to 5000 pounds per square inch.

7. The method of claim 6 wherein the reaction is effected at temperatures not substantially higher than room temperatures.

8. The method of claim 6 wherein the reaction is effected at temperatures below 0° F.

9. The method of claim 6 wherein about 2 to 20% of the paraffinic hydrocarbon gases consists of isobutane.

10. The method of claim 6 wherein the reaction is effected at temperatures not higher than 500° F.

11. The method of making high quality gasoline from hydrocarbon gases containing propylene and butylenes admixed with propane, butane and isobutane which comprises liquefying said hydrocarbon mixture, introducing into said mixture a promoter of the class consisting of chlorine, hydrochloric acid and organic chlorides and contacting said mixture in the presence of said promoter with a catalytically active alumina-aluminum chloride mixture under a pressure of 15 to 600 pounds per square inch, and at a temperature not substantially higher than atmospheric temperature.

CARL MAX HULL.
FORD H. BLUNCK.